W. N. Clark,
Wood Auger.

No. 3,899. Patented Jan. 31, 1845.

Witnesses

Inventor
William N. Clark

UNITED STATES PATENT OFFICE.

WILLIAM N. CLARK, OF CHESTER, CONNECTICUT.

SINGLE-TWIST AUGER, GIMLET, &c.

Specification of Letters Patent No. 3,899, dated January 31, 1845.

*To all whom it may concern:*

Be it known that I, WILLIAM N. CLARK, of Chester, in the county of Middlesex and the State of Connecticut, have invented a new and useful Improvement in the Auger commonly known as the "Single-Twist Ship-Auger," and that the following is a full and exact description of the same.

I refer to the drawings accompanying this specification as explanatory of the same.

The inner surfaces of the twist of the common auger are convex. This form is objectionable, as it breaks the chip and causes the fragments to work in between the outside of the auger, and the inner surface of the hole, binding and clogging the auger and rendering it necessary, frequently to withdraw it in the process of boring for the purpose of clearing out the chips. The auger is also liable to be injured by such frequent removal from the hole when clogged the pressure being such as to act upon the twist and derange it.

My improvement consists in making the upper inner surface A of the twist of the auger B, concave so that an auger of any desirable length works easily and freely, raising the chip continuously through the cavity to the top of the hole without breaking the chip or leaving any fragments to work in between the outside of the auger and inner surface of the hole and thereby overcoming entirely the difficulty of clogging, and the consequent necessity of its being withdrawn to clear it during the process of boring, the hole is smooth and accurate and the time and labor of the operator is very much abridged. This principle may be applied to the bit and gimlet. A being the inner concave surface C, the inner convex surface and D the outer surface.

Figure 1:
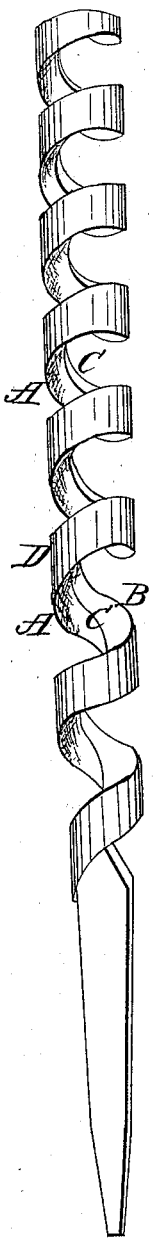
Figure 3:
Figure 2:
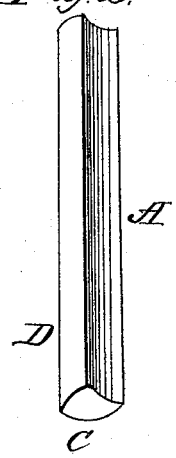

Figure 1, in the drawings represents the auger. Fig. 2, represents the form of the material for the auger before it is twisted and Fig. 3, represents a section of the said material.

What I claim as my improvement, and desire to secure by Letters Patent, is—

The mode of making the single twist ship auger, the bit and gimlet, with the upper inner surface A of the twist concave as above described and for the object set forth.

Chester, Conn., November 4, A. D. 1844.

WILLIAM N. CLARK.

Witnesses:
ELY WARNER,
JONATHAN WARNER.